(12) United States Patent
Zhou et al.

(10) Patent No.: US 11,249,667 B2
(45) Date of Patent: Feb. 15, 2022

(54) STORAGE PERFORMANCE ENHANCEMENT

(71) Applicant: International Business Machines Corporation, Armonk, NY (US)

(72) Inventors: Hong Zhou, Shanghai (CN); Gang Lyu, Shanghai (CN); Jun Gu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/561,061

(22) Filed: Sep. 5, 2019

(65) Prior Publication Data
US 2021/0072916 A1 Mar. 11, 2021

(51) Int. Cl.
*G06F 12/00* (2006.01)
*G06F 3/06* (2006.01)

(52) U.S. Cl.
CPC .......... *G06F 3/0647* (2013.01); *G06F 3/0604* (2013.01); *G06F 3/0689* (2013.01)

(58) Field of Classification Search
CPC ....... G06F 3/0647; G06F 3/064; G06F 3/0689
See application file for complete search history.

(56) References Cited

U.S. PATENT DOCUMENTS

| | | | |
|---|---|---|---|
| 8,694,724 B1 * | 4/2014 | Linnell | G06F 12/0866 711/114 |
| 8,914,577 B2 | 12/2014 | Daikokuya | |
| 8,930,750 B2 | 1/2015 | Gao | |
| 10,013,321 B1 | 7/2018 | Stern | |
| 10,210,045 B1 | 2/2019 | Gao | |
| 2005/0144414 A1 * | 6/2005 | Yamamoto | G06F 3/067 711/170 |
| 2018/0121102 A1 * | 5/2018 | Paulzagade | G06F 3/0653 |
| 2020/0409858 A1 * | 12/2020 | Huang | G06F 9/30047 |

OTHER PUBLICATIONS

Disclosed Anonymously, "A smart sparing system for declustered RAID storage", An IP.com Prior Art Database Technical Disclosure, IP.com No. IPCOM000245964D IP.com, Electronic Publication Date: Apr. 21, 2016, 9 pages.

* cited by examiner

*Primary Examiner* — Shawn X Gu
*Assistant Examiner* — Mohammad S Hasan
(74) *Attorney, Agent, or Firm* — Christopher M. Pignato

(57) ABSTRACT

Solutions for processing a redundant array of storage drives receiving a rebuilding request of a redundant array of storage drives. The redundant array has a first storage drive to be replaced. In response to no spare storage drive being available to logically replace the first storage drive, a second storage drive is identified, which is a source storage drive of a disk balance process being performed. A rebuilding of the redundant array is initiated by reconstructing data of the first storage drive on the second storage drive during the disk balance process.

20 Claims, 5 Drawing Sheets

STORAGE PERFORMANCE ENHANCEMENT

BACKGROUND

The present invention relates to storage processing, and more specifically, to methods, systems and computer program products for processing a redundant array of storage drives.

Physical storage devices include hard disk drives (HDDs) and solid state drives (SSDs). Computing devices, like computers, store data on such physical storage devices. Redundant arrays of storage drives, such as a redundant array of independent disks (RAID) are used extensively to provide data redundancy in order to protect data and prevent data loss. Various different "RAID levels" have been defined, each providing data redundancy in a different way. Each of these RAID levels provides data redundancy in a way that, if one (or possibly more) storage drive in the RAID fails, data in the RAID can still be recovered.

SUMMARY

According to one embodiment of the present invention, there is provided a computer-implemented method, associated computer systems and computer program products implementing a method for processing a redundant array of storage drives. In this method, a rebuilding request of a redundant array of storage drives is received. The redundant array has a first storage drive to be replaced. In response to no spare storage drive being available to logically replace the first storage drive, a second storage drive is identified, which is a source storage drive of a disk balance process being performed. The disk balance process is copying data from the second storage drive to a third storage drive. A rebuilding of the redundant array is initiated by reconstructing data of the first storage drive on the second storage drive during the disk balance process.

These and other features and advantages of the present invention are described herein and should be apparent to those of ordinary skill in the art in view of, the following detailed description of the embodiments of the present disclosure.

BRIEF DESCRIPTION OF THE SEVERAL VIEWS OF THE DRAWINGS

The detailed description of some embodiments of the present disclosure and the accompanying drawings, the features and advantages of the present disclosure will become more apparent, wherein the same reference number generally refers to the same components in the embodiments of the present disclosure.

DETAILED DESCRIPTION

Figure 1:
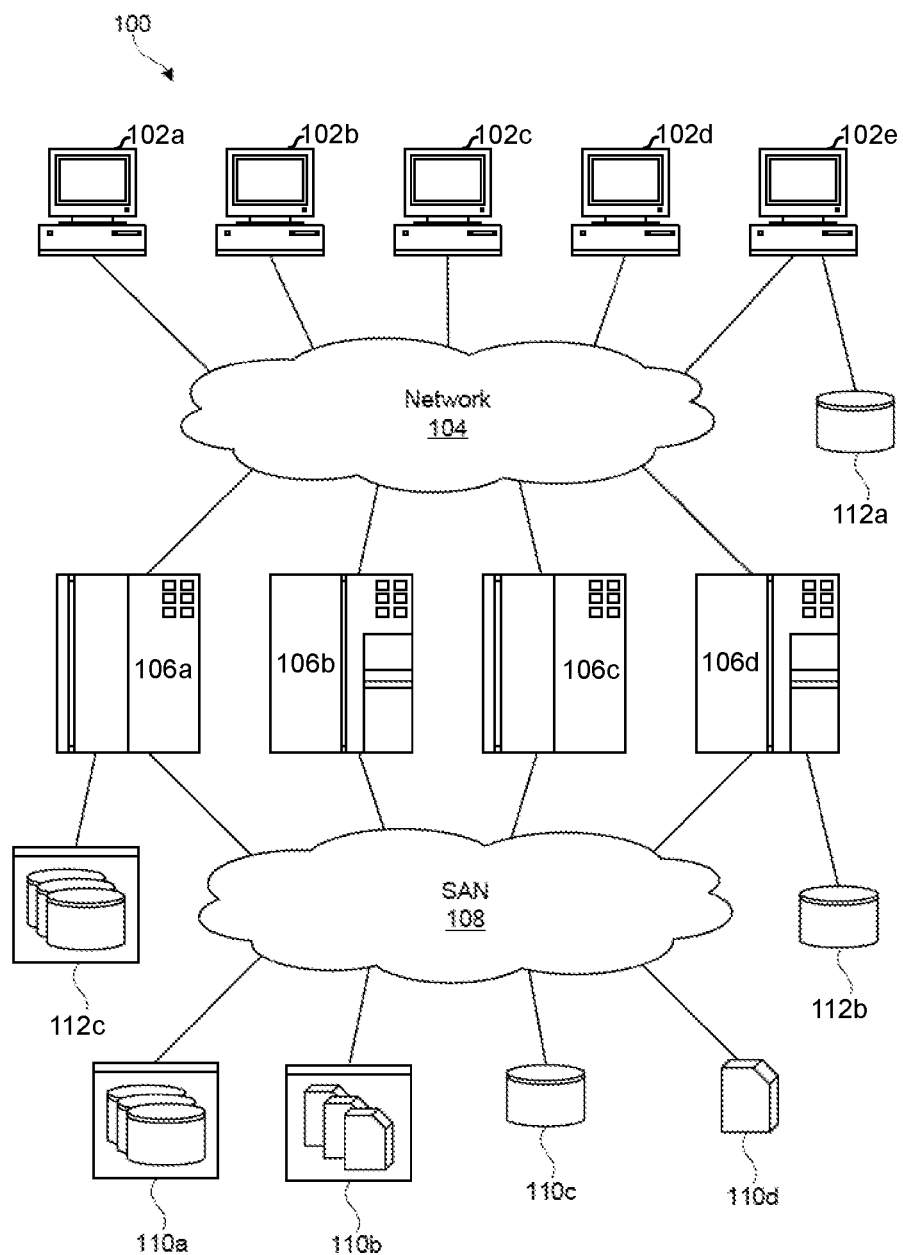
FIG. 1 is a high-level block diagram showing one example of a network architecture in accordance with one or more embodiments of the present disclosure.

It will be readily understood that the components of the present invention, as generally described and illustrated in the figures herein, could be arranged and designed in a wide variety of different configurations. Thus, the following more detailed description of the embodiments of the invention, as represented in the figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), electrically erasable programmable read-only memory (EEPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Referring to FIG. 1, an example of a network environment 100 is illustrated. The network environment 100 is presented to exemplify an environment where embodiments of the invention may operate. The network environment 100 is presented only by way of example and not a limitation. The systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN), a wide-area-network (WAN), the Internet, an intranet, or the like. In certain embodiments, the computers 102 and server computers 106 may include both client computers 102 (represented as client computers 102a-102e) and server computers 106 (represented as server computers 106a-106d which can also be referred to herein as "hosts", "servers" or "host systems"). In general, the client computers 102 initiate communication sessions, whereas the server computers 106 wait for and respond to requests from the client computers 102. In certain embodiments, the client computers 102 and/or servers 106 may connect to one or more internal or external direct-attached storage systems 112 (e.g., arrays of hard-disk drives, solid-state drives, tape drives, etc.) and represented in the drawings by 112a-112c. These computers 102, 106 and direct-attached storage systems 112 may communicate using protocols such as Advanced Technology Attachment (ATA), Serial ATA (SATA), Small Computer System Interface (SCSI), Serial Attached SCSI (SAS), Fiber Channel (FC), or the like.

The network environment 100 may, in certain embodiments, include a storage network behind the servers 106, such as a storage-area-network (SAN) 108 or a LAN (e.g., when using network-attached storage). This SAN 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries (not shown), or the like. To access a storage system 110, a host system 106 may communicate over physical connections from one or more ports on the host 106 to one or more ports on the storage system 110. A connection may be established through a switch, communications fabric, direct connection, or the like. In certain embodiments, the servers 106 and storage systems 110 may communicate using a networking standard such as FC or Internet SCSI (iSCSI).

Figure 2:
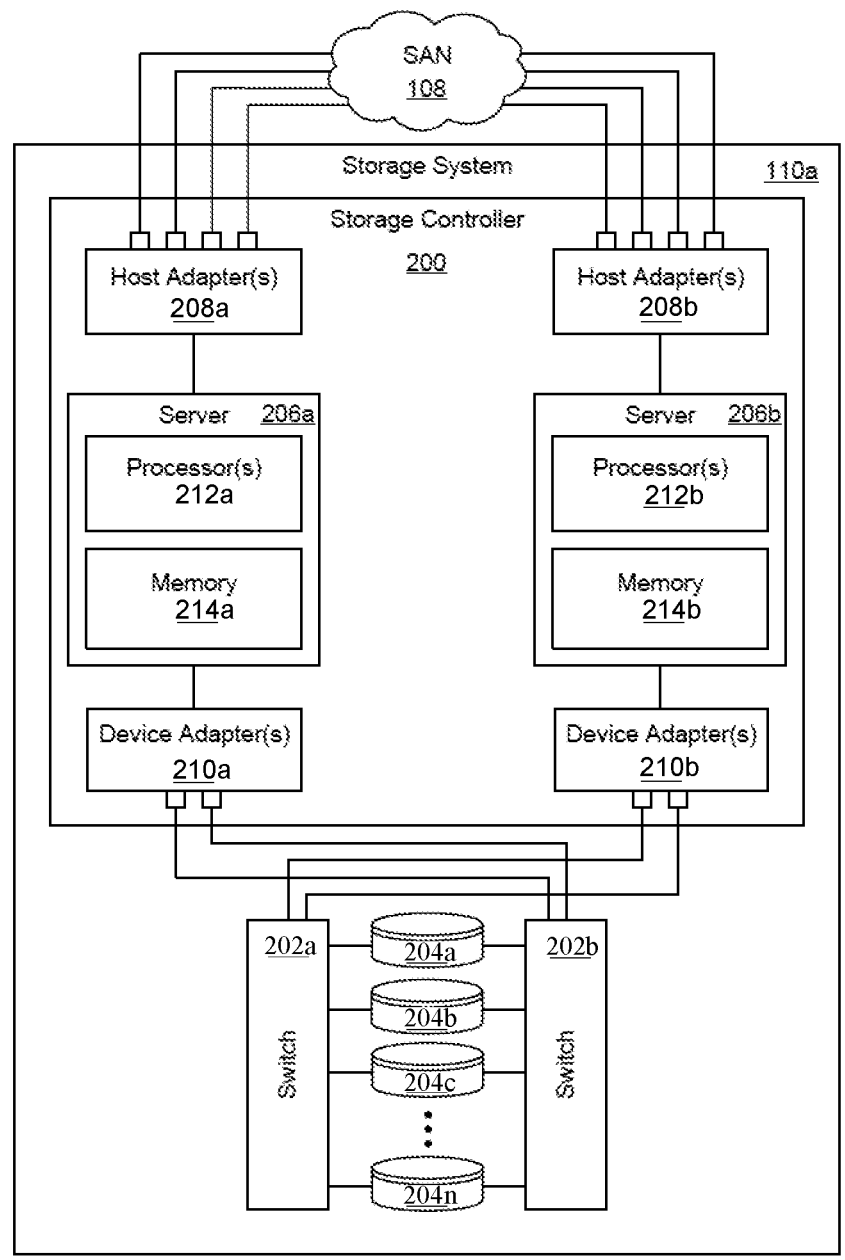
FIG. 2 is a high-level block diagram showing one example of a storage system in accordance with one or more embodiments of the present disclosure.

Referring to FIG. 2, one embodiment of a storage system 110a containing an array of storage drives 204 (e.g., hard-disk drives and/or solid-state drives) is illustrated. A storage system 110 may comprise variable amounts of storage devices 204 from storage system 110 to storage system 110. To represent the variation in the number of storage drives 204 that may be present within a storage system 110, the plurality of storage drives 204 are depicted by the drawings are represented as storage drives 204a, 204b, 204c . . . 204n, where the nth storage drive 204 is the last storage drive 204 in the array of storage drives 204. The internal components of the storage system 110a are shown since the systems and methods disclosed herein may, in certain embodiments, be implemented within such a storage system 110a, although the systems and methods may also be applicable to other storage systems.

As shown, the storage system 110a includes a storage controller 200, one or more switches 202 (depicted as switch 202a and switch 202b), and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204. In some embodiments, the storage controller 200 includes one or more servers 206 as shown in the drawings depicting server 206a and server 206b. The storage controller 200 may also include one or more host adapters 208 (represented as host adapter(s) 208a, 208b) and device adapter(s) 210 (depicted as device adapter(s) 210a, 210b) to connect storage controller 200 to host devices 106 and storage drives 204, respectively. During normal operation (when both servers 206a, 206b are operational), the servers 206a, 206b may manage input and output (I/O) to different logical subsystems (LSSs) within the storage system 110a. For example, in certain configurations, a first server 206a may handle I/O to even addressed LSSs, while a second server 206b may handle I/O to odd addressed LSSs. These servers 206a, 206b may provide redundancy to ensure that data is always available to connected servers 106. Thus, when one server 206a fails, the other server 206b may pick up the I/O load of the failed server 206a, to ensure that the I/O can continue between the servers 106 and the storage drives 204. This process may be referred to as a "failover."

In selected embodiments, each server 206 includes one or more processors 212 (depicted as processor(s) 212a, 212b) and memory 214 (depicted as memory 214a, 214b). The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data stored by the storage drives 204. These software modules may manage all read and write requests transmitted to logical volumes in the storage drives 204.

In selected embodiments, the memory 214 includes a cache, such as a DRAM cache. Whenever a server 206 (e.g., an open system or mainframe server 106) performs a read operation, the server 206 that performs the read may fetch data from the storages drives 204 and save it in the cache of a memory 214, in the event data being fetched is required again. If the data is requested again by a server 206, the server 206 may fetch the data from the cache instead of fetching it from the storage drives 204, saving both time and resources. Similarly, when a server 206 performs a write, the server 206 that receives the write request may store the write operation in the cache of memory 214, and de-stage the write operation to the storage drives 204 at a later time. When a write operation is stored in the cache of memory 214, the write operation may also be stored in non-volatile storage (NVS) of the opposite server 206, so that the write operation can be recovered by the opposite server 206 in the event the first server 206 fails. For example, first server 206a receives a write request to perform a write operation. The first server 206a stores the write operation in the cache of memory 214a and the opposite server 206b may also store the write operation in the NVS of server 206b, i.e., the cache of memory 214b. In certain embodiments, the NVS is implemented as battery backed cache in the opposite server 206b.

One example of a storage system 110a having an architecture similar to that illustrated in FIG. 2, is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system but may be implemented in any comparable or analogous storage system or group of storage systems, regardless of the manufacturer, product name, components or component names associated with the system. Any storage system that could benefit from one or more embodiments of the invention is deemed to fall within the scope of the invention. Thus, the IBM DS8000™ is presented only by way of example and is not intended to be limiting.

Figure 3:
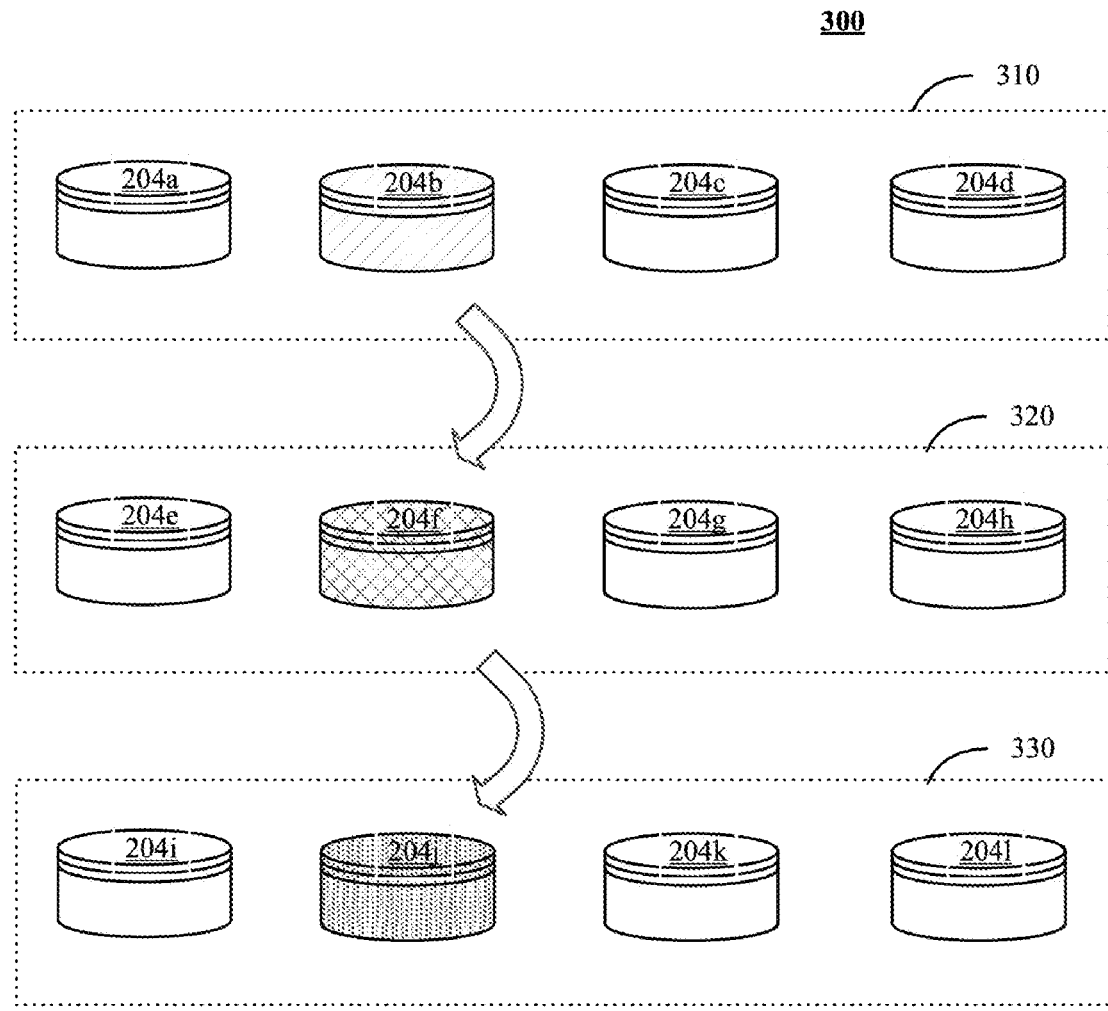
FIG. 3 is a high-level block diagram showing an array of storage drives in accordance with one or more embodiments of the present disclosure.

Referring to FIG. 3, a high-level block diagram showing a storage pool 300 of storage drives 204a-204l is illustrated. Such a storage pool 300 may be included in a storage system 110 illustrated in FIG. 2 and described herein. In the exemplary embodiment of FIG. 3, the storage pool 300 includes twelve storage drives, (204a-204l), although this number should not be considered limiting. Any other number of storage drives 204 could be included in the storage pool 300. The storage drives 204 within the storage pool 300 may be organized into one or more RAID configurations of any RAID level. For example, in the embodiment shown in FIG. 3, the storage drives 204a-204d are organized into a RAID array 310, and the storage drives 204i-204l are organized into a RAID array 330. The number of storage drives within each RAID array 310, 330 may also vary as known to those of ordinary skill in the art. Some storage drives 204 such as storage drives 204e-204h within the storage pool 300, may be organized into a spare pool 320, which may provide spare storage drives for various purposes.

As can be appreciated, organizing storage drives 204 into a RAID array 310, 330 provides data redundancy that allows data to be preserved in the event one (or possibly more) storage drive 204 within the RAID array 310, 330 fails. In a conventional RAID rebuild, when a storage drive in a RAID configuration, for example, the storage drive 204j in the RAID array 330 fails or is found to be failing, the RAID array 330 can be rebuilt using a spare storage drive from the spare pool 320. For example, using the storage drive 204f in the spare pool 320 to logically replace the failing storage drive 204j, thereby restoring data redundancy. Specifically, the data on the failing storage drive 204j can be recovered on the storage drive 204f with redundant data stored by other storage drives of the RAID array 330. As a result of the replacement, storage drive 204f becomes a new member of the RAID array 330. Embodiments of RAID array 330 can be rebuilt as expeditiously as possible to minimize the possibility that another storage drive 204 will fail and result in permanent data loss.

Usually, the failing drive 204j will be physically replaced with a new drive after the rebuilding with the spare drive 204f. In some embodiments, the new drive will become a spare drive and may be configured as part of the spare pool 320. A drive balance task, also called a disk balance task herein, may be triggered (sometimes right away) to copy the data from the new member of the RAID array 330 (i.e. storage drive 204f) to the new drive introduced to replace the previously existing failed storage drive (i.e. 204j). The implementation of the drive balance task may result in achieving the best performance and maintenance service of the RAID array 330 over time. After the disk balance is performed, the storage drive replacing storage drive 204j would become a new member of RAID 330 and the storage drive 204f is released back to the spare pool 320. In some embodiments, an intermix of SSD/HDD in the shared spare pool 320 and high capacity flash drive(s) may be used.

In the above example, if the storage drive 204b in the RAID array 310 fails or is failing while there is no available spare storage drive in the spare pool 320 (for example, all of the storage drives 204e, 204f, 204g, 204h in the spare pool 320 have been occupied), according to some designs, the rebuilding request might be held or delayed until a spare storage drive becomes available. As a result of the delay in implementing the rebuilding request, RAID array 310 could be placed into an exposed state, increasing the probability that a failure will occur that results in permanent data loss. Accordingly, in some embodiments, a solution for processing a rebuilding request while there is no spare drive available can be implemented to avoid the rebuilding delay. According to embodiments of the present invention, if there is a disk balance task being performed from one storage drive 204 to another storage drive 204, a source drive of the disk balance task may be leveraged to perform the rebuilding process simultaneously. For example, in the example storage pool 300 as shown in FIG. 3, if the storage drive 204b is failing and the corresponding RAID array 310 needs to be rebuilt while the storage drives 204e, 204g, 204h in the spare pool 320 have been occupied, and a disk balance task is being performed to copy the data from storage drive 204f to the storage drive 204j, the source drive 204f of the disk balance task may be used as a spare storage drive for the rebuilding of RAID array 310.

In the context of the present disclosure, the term "rebuild" or "rebuilding" may refer to either a normal array rebuilding process or a smart rebuilding process. Smart rebuilding is a function that is designed to help reduce the possibility of dual failures and data loss of RAID arrays. It can be used to rebuild a RAID 5 array when certain drive errors occur, and a normal determination is made to use a spare storage drive 204 to proactively replace a failing storage drive 204. If the suspect storage drive 204 is still available for I/O, the spare storage drive 204 is kept in the array rather than being rejected (as under a normal RAID rebuild). A spare drive is brought into the RAID array, as an additional member, at the same time. The suspect storage drive and the new storage drive being added to the RAID array (i.e. the spare storage drive) can be set up in a temporary RAID 1 association, allowing the failing storage drive 204 to be duplicated onto the spare storage drive 204 rather than running a full RAID reconstruction from data and parity. The new storage drive 204 may then be made a regular member of the RAID array while the suspect drive is rejected from the RAID array. The array may never go through an n-1 state in which it might suffer a complete failure if another drive in this same array encounters errors during the replacement process. The result saves substantial time and provides a new level of availability.

Smart rebuilding is not applicable in all situations, so it may not always be used. If two storage drives 204 with errors are in a RAID 6 configuration, or if the drive mechanism of a storage device 204 fails to the point that it cannot accept any I/O, the standard RAID rebuild procedure would be used for the RAID array. If communications across a drive fabric are compromised, such as a fiber channel arbitrated loop (FC-AL) error that causes the storage drive 204 to be bypassed, standard RAID rebuild procedures are used because the suspect storage drive 204 may not be available for a one-to-one copy with a spare storage drive 204. If smart rebuilding is not possible or does not provide the designed benefits, a normal array rebuilding occurs.

Furthermore, in the context of the present disclosure, the term "disk balance" or "drive balance" may refer to the roles of a RAID array storage drive 204 member and a spare storage drive 204 by copying the data from the RAID array storage drive 204 member to the spare storage drive 204. Disk balance may be common in a storage system 110 to let the RAID array keep the initial configuration for best I/O performance. A disk balance request may be based on disk type, disk location, disk capacity, etc. Disk balance may be realized by a smart rebuilding process or a normal rebuilding process while usually a smart rebuilding would be more effective.

Figure 5:
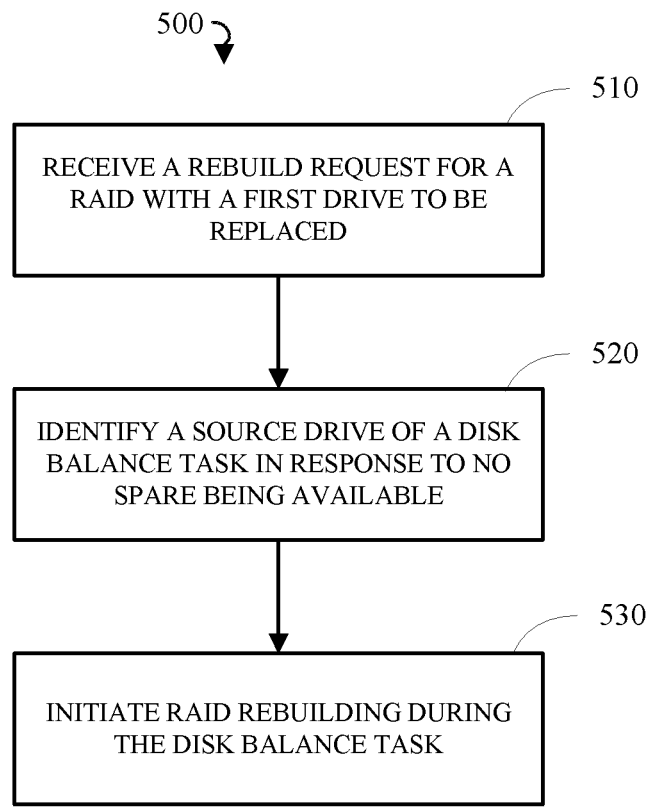
FIG. 5 is a process flow diagram showing an embodiment of a method according to the present disclosure.

Referring to FIG. 5, a method 500 for processing a RAID rebuilt according to an embodiment of the present invention is illustrated. According to embodiments of the present invention, the method 500 may be implemented by a storage controller 200. The storage controller 200 may be implemented as hardware, software or a combination thereof. The storage controller 200 may manage storage drives 204 (i.e., hard disk drives and/or solid state drives) and present them to one or more host devices 106 as logical units. If a storage drive 204 in a RAID array fails (thereby destroying the data redundancy), the storage controller 200 may rebuild the RAID array using a spare storage drive 204, thereby restoring data redundancy. The RAID array may be rebuilt as expeditiously as possible to minimize the possibility that another storage drive 204 in the RAID array may fail, which may result in permanent data loss.

It should be noted, that although methods and systems according to embodiments of the present invention are described in association with a RAID array, the methods and systems according to embodiments of the present invention may be applied to other types of redundant storage configurations, such as erasure code. The systems and methods may also be applied to memory managers or storage virtualization products that provide RAID-like redundancy/performance using different types of storage media.

As shown in FIG. 5, at step 510, the method 500 receives a rebuilding request for a RAID array. The RAID array has a storage drive 204 scheduled to be replaced, which is called a first storage drive 204a hereinafter. According to an embodiment of the present invention, the rebuilding request is a request for a normal array rebuilding. According to another embodiment of the present invention, the rebuilding request is a request for a smart rebuilding.

At step 520, in response to no spare storage drive being available to logically replace the first storage drive 204a, a source storage drive 204 of a disk balance process being performed is identified. The source storage drive 204 is called a second storage drive 204*b* hereinafter. The disk balance process copies data from the second storage drive 204*b* to a third storage drive 204*c*. According to embodiments of the present invention, the disk balance process may be performed with a normal array rebuilding process or a smart rebuilding process.

At step 530, during the disk balance process, the rebuilding of the RAID array is initiated by reconstructing data of the first storage drive 204*a* on the second storage drive 204*b*. According to an embodiment of the present invention, the data of the first storage drive 204*a* is reconstructed onto a free area of the second storage drive 204*b*. The original data, reconstructed onto the free area is copied from the second storage drive 204*b* to the third storage drive 204*c* during the disk balance process.

Depending on the RAID level of the RAID array, different rebuilding processes may be used to recover data on the RAID array. For example, in a typical rebuilding process, a pointer may be set based on the rebuilding address to keep track of the rebuilding progress. A bitmap may be setup for all of the strides of the RAID array. After one stride gets rebuilt/copied, the pointer may be changed to the next continuous value to move on to the rebuilding task. A corresponding value in the bitmap can be updated to indicate whether the corresponding stride has already been rebuilt or copied. Before each rebuild or copy action, the bit value in the bitmap can be checked to determine whether a rebuild is required against a current stride. With the method described with reference to FIG. 5 above, the rebuilding request may be processed even when there may not be a spare storage drive 204 available, which would help to get the rebuilding processed completed as expeditiously as possible.

According to an embodiment of the present invention, when the rebuilding of the RAID is initiated and the disk balance process is ongoing, the second storage drive 204*b* may be set in a protected state. After the disk balance task is completed, the second storage drive may be removed from the protected state, allowing the bandwidth of the second storage drive 204*b* to be used for the rebuilding process.

Using the storage pool 300 described above and exemplified in FIG. 3 as an example to illustrate a process shown in FIG. 5, a RAID array 310, may have a storage drive 204*b* that is found to be failing or failed, and a rebuild request for the RAID array 310 can be received by the storage controller 200. In the case where the storage drive 204*b* has failed and is rejected from RAID array 310, a normal array rebuilding could be processed, and the rebuilding request would be a normal array rebuilding request. In the case where the storage drive 204*b* is found to be failing, a smart rebuilding may be processed, and the rebuilding request would be a smart rebuilding request. The storage controller 200 checks whether there is a spare storage drive 204 available for the RAID rebuilding within spare pool 320 and finds that all of the storage drives 204*e*-204*h* in the spare pool 320 are being used and there is no spare storage drive 204 currently available. The storage controller 200 can identify the storage drive 204*f*, which is being used to perform a disk balance task as a source. That is, the data on the storage drive 204*f* is being copied to the storage drive 204*j*, a target of the disk balance task. During the disk balance task, the rebuilding of the RAID array 310 can be initiated by reconstructing data of the storage drive 204*b* onto the free area of storage drive 204*f* while the data of the storage drive 204*f* is being copied to the storage drive 204*j*. The original data on the free area is copied from the storage drive 204*f* to the corresponding area of the storage drive 204*j* during the disk balance process.

Figure 4:
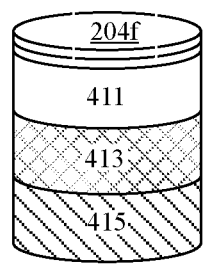
FIG. 4 is a high-level diagram showing an example storage drives according to an embodiment of the present invention.

Referring to FIG. 4, an example storage drive 204*f* for implementing a rebuilding process according to an embodiment of the present invention is illustrated. As shown in FIG. 4, the storage drive 204*f* includes three areas: rebuilding area 411, free area 413, and balance area 415. It should be noted that the terms of rebuilding area, free area and balance area are used for descriptive purpose and are not limiting. The rebuilding area 411 refers to the area for storing data which is reconstructed (called "rebuilding data" hereinafter) from the rebuilding RAID array. In other words, rebuilding RAID array 310 for the failing storage drive (the storage drive 204*b*). The free area 413 refers to the area for storing data of the source drive (the storage drive 204*f*) which has already been copied to the target drive (the storage drive 204*j*) while still not over-written by the rebuilding data. The balance area 415 refers to the area for storing data of the source drive (the storage drive 204*f*) which is still waiting to be copied to the target drive (the storage drive 204*j*). Although in FIG. 4 the rebuilding area 411, the free area 413 and the balance area 415 are shown as one area covering successive disk portions in the storage drive, the areas may also include discontinuous disk portions distributed in the storage drive 204*f*. As the rebuilding process and the disk balance process proceed, the rebuilding area 411, the free area 413 and the balance area 415 can be dynamically changed. That is, as the disk balance process proceeds, the data in the balance area 415 is copied from the storage drive 204*f* to the storage drive 204*j*, an increased amount of space comprising the balance area 415 would become free area 413. As the rebuilding process proceeds, the data of the storage drive 204*b* is reconstructed onto the free area 413 of storage drive 204*f*, and free area 413 would increasingly become rebuilding area 411. Finally, when there is no balance area 415 left on the storage drive 204*f*, the disk balance process would be completed.

As mentioned above, according to an embodiment of the present invention, when the rebuilding of the RAID array 310 is initiated and the disk balance task is ongoing, the storage drive 204*f* may be set in a protected state. While the storage drive 204*f* is in a protected state, the disk balance related host I/O to the rebuilding area 411 can be redirected to a corresponding area in the target storage drive 204*j*. The disk balance related host I/O to the free area 413 and the balance area 415 can be kept the same as a normal disk balance process. The disk balance related host I/O may refer to the access to the disk balance array by the host 106. At the same time, the rebuilding related host I/O to the rebuilding area 411 and the free area 413 can be kept the same as a normal rebuilding process. The rebuilding related host I/O to the balance area 415 can be held until the data in the balance area 415 has been copied to the target storage drive 204*j* and the balance area 415 becomes a free area. The rebuilding related host I/O may refer to the access to the rebuilding array by the host 106. When all of the balance area 415 becomes free area, which means that the disk balance process has been completed, the storage drive 204*f* can be removed from the protected state. And the rebuilding process can be continued within the free area 411, as a normal rebuilding process.

When a RAID array is being rebuilt due to a disk failure, the storage controller 200 can utilize bandwidth and/or processing resources to reconstruct the lost data. Also, the storage controller 200 may utilize bandwidth and/or processing resources to process the disk balance task. To achieve a better performance and/or decrease the rebuild time, the throughputs of the disk balance process and the rebuilding process may be set and dynamically adjusted during the processes. The objective may be to ensure the capacity of free area 411 released from the disk balance task can be leveraged for rebuilding as soon as possible, by assigning appropriate throughputs for the disk balance and rebuilding process.

An example throughput control process can be described as discussed in detail below:

Set variables as below:

$C_d$: total capacity for source drive $C_f$: free capacity on source drive at the time rebuilding request raised ($t_0$)

$T_b$: total available bandwidth (throughput) for source drive $T_s$: throughput for the disk balance task at $t_0$ $T_r$: throughput for the rebuilding at $t_0$ Using $C'_f$, $T'_s$, $T'_r$ to indicate the corresponding values at a time after $t_0$ and before disk balance completes $C_r$: the total capacity of the rebuilding area at a time after $t_0$ and before disk balance completes And the following relationship would be obtained:

$$\begin{cases} T_r + T_s = T_b \\ \dfrac{C_d - C_f}{T_s} = C_d / T_r \end{cases} \Rightarrow \begin{cases} T_s = \dfrac{T_b(C_d - C_f)}{2C_d - C_f} \\ T_r = \dfrac{T_b C_d}{2C_d - C_f} \end{cases} \quad \text{Equation (1)}$$

$$\begin{cases} T'_r + T'_s = T_b \\ \dfrac{C_d - C'_f}{T'_s} = \dfrac{C_d - C_r}{T'_r} \end{cases} \Rightarrow \begin{cases} T'_s = \dfrac{T_b(C_d - C'_f)}{2C_d - C'_f - C_r} \\ T'_r = \dfrac{T_b(C_d - C_r)}{2C_d - C'_f - C_r} \end{cases} \quad \text{Equation (2)}$$

At the time a rebuilding request is raised ($t_0$), the throughput for the disk balance task $T_s$ and the throughput for the rebuilding $T_r$ may be set according to Equation (1).

With the progress of the disk balance and the rebuilding, for example, after a predefined time, check whether the differences between $T_s$ and $T'_s$ exceed a predefined threshold. If yes, the throughput for the disk balance task $T'_s$ and throughput for the rebuilding $T'_r$ may be updated according to the Equation (2), to optimize performance for the dual rebuilding process.

The following example is a comparison of respective average strip available times in a conventional rebuilding process ("conventional design" hereinafter) and in a rebuilding process according to an embodiment of the present invention ("current design" hereinafter) may be made to assess the performance of the method according to an embodiment of the present invention. Assuming, n is a total number of strips in the member disk to be rebuilt, then $$s = \frac{C_d}{n}$$

refers to a size for each strip in the member disk.

Assuming the start time for the disk balance on the spare drive 204 as 0, and set the variables as below:

$t_i$: available time for number i strip for the rebuilding disk in the conventional design $t'_i$: available time for number i strip for the rebuilding disk in the current design $t_D$: time for disk balance task to complete $$t^* = \frac{C_f}{T_b}:$$

time for the rebuilding request raised $\tilde{t}$: average strip available time in the conventional design $\tilde{t}'$: average strip available time in the current design The following relationships can be obtained:

$$t_i = t_D + i * \frac{s}{T_b} = \frac{C_d - C_f}{T_b} + i * \frac{C_d}{nT_b}$$

Then the average strip available time for the array in the conventional design would be:

$$\tilde{t} = \frac{1}{n} * \sum_{i=1}^{n} t_i =$$

$$\frac{1}{n} * \frac{n}{2}(t_1 + t_n) = \frac{1}{2} * \left(2 * t_1 + (n-1) * \frac{C_d}{nT_b}\right) = \frac{(3n+1)C_d - 2nC_f}{2nT_b}$$

$$t'_i = i * \frac{s}{T_r} = i * \frac{C_d}{n} * \frac{2C_d - C_f}{T_b C_d} = i * \frac{2C_d - C_f}{nT_b}$$

Then the average strip available time for the array in the current design would be:

$$\tilde{t}' =$$

$$\frac{1}{n}\sum_{i=1}^{n} t'_i = \frac{1}{n} * \frac{n}{2}(t'_1 + t'_n) = \frac{1}{2} * \left(2 * t'_1 + (n-1) * \frac{s}{T_r}\right) = \frac{(n+1)(2C_d - C_f)}{2nT_b}$$

The comparison between the two parameters would be:

$$\delta = \tilde{t} - \tilde{t}' = \frac{(n-1)(C_d - C_f)}{2nT_b} > 0$$

The above comparison shows that, with the method according to embodiments of the present invention, the average strip available time for the rebuilding array would be shorter than the one in a conventional design for rebuilding an array.

Figure 6:
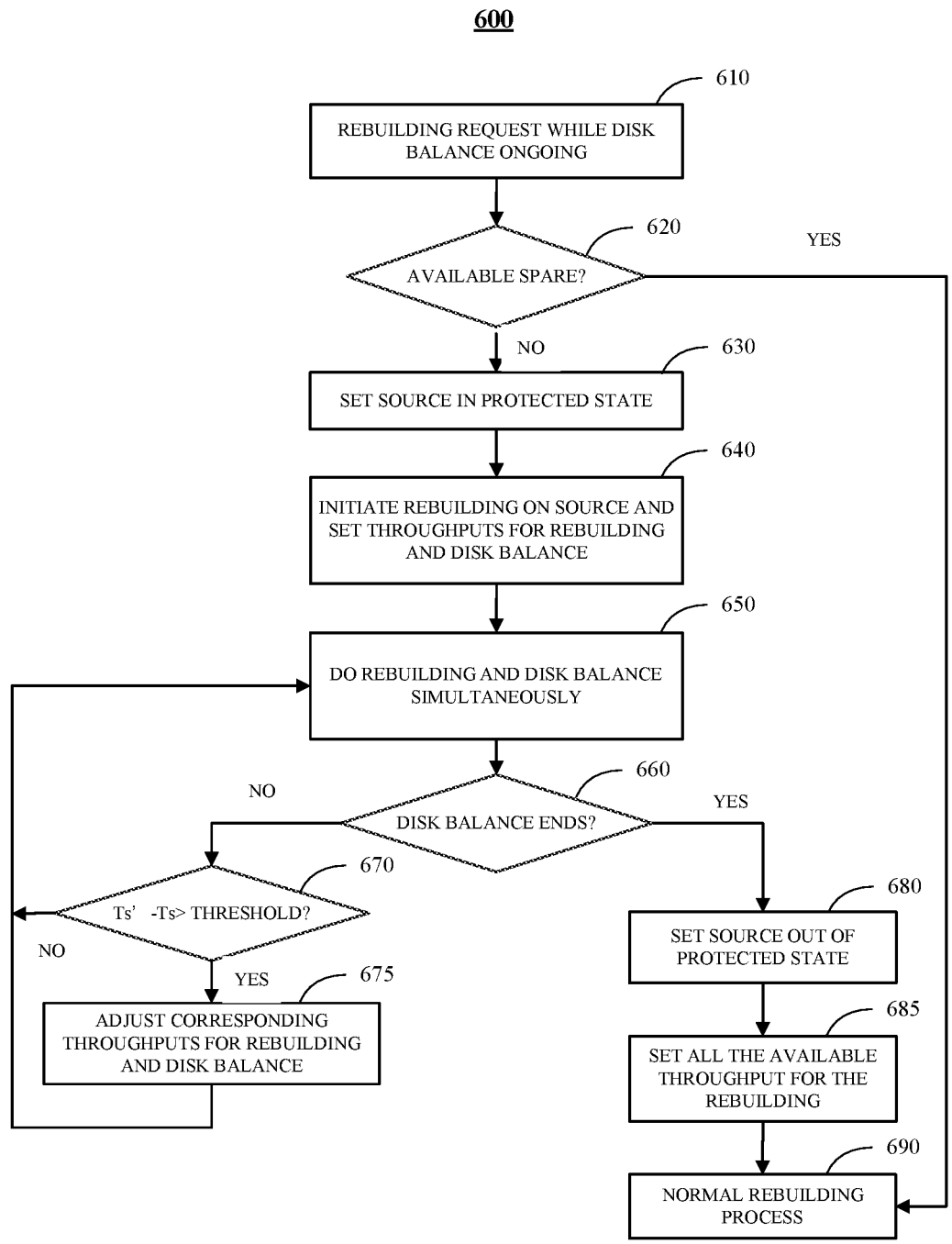
FIG. 6 is a process flow diagram showing an embodiment of a method in accordance with the present disclosure.

Referring to FIG. 6, a method 600 for processing RAID rebuilding, according to an embodiment of the present invention is illustrated. According to embodiments of the present invention, the method may be implemented by a storage controller 200. At step 610, a rebuilding request for a RAID array is received while there is a disk balance task ongoing. At step 620, it's determined whether there is any spare storage drive 204 available for the RAID array rebuilding. If yes, the process goes to step 690 to perform a normal rebuilding process. If it's determined at step 620 that there is no spare storage drive 204 available, at step 630, a source storage drive 204 of the disk balance task is identified and set into a protected state. At step 640, the rebuilding of the RAID array is initiated by reconstructing data on the source storage drive 204, and the throughputs of disk balance process and the rebuilding process may be set accordingly. At step 650, the disk balance process and the rebuilding process are performed simultaneously. At step 660, a check is performed to determine whether the disk balance process ends. If yes, the process goes to step 680, the source storage drive 204 is removed from the protected state and at step 685, all of the available throughput is set for the rebuilding process. The process goes to step 690 to perform a normal rebuilding process.

If it's determined at step 660 that the disk balance has not been finished, the method 600 proceeds to step 670. At step 670, a determination is made whether the differences between $T_s$ and $T'_s$ exceed a predefined threshold. If yes, the process goes to step 675, where the throughput for the disk balance task $T'_s$ and throughput for the rebuilding $T'_r$ may be adjusted so as to obtain the best performance for the dual rebuilding process, and the process returns to step 650 to continue the rebuilding process and disk balance process. If it's determined at step 670 that the differences between $T_s$ and $T'_s$ does not exceed a predefined threshold, the process returns to step 650 directly.

The above-described performance enhancement techniques may be used with RAIDs of various different RAID levels and are not limited to any particular RAID level. Similarly, the described performance enhancement techniques are compatible with RAIDs containing different numbers of storage drives 204. Accordingly, the above-described techniques and configurations are provided only by way of examples and not limitation.

Although the systems and methods disclosed herein have been discussed primarily in association with storage drives 204 configured in a RAID array, the systems and methods may be applied to other types of storage configurations. For example, solid state drives may include a RAID or similar controller to stripe or mirror data across memory modules or chips within the storage drive 204. The systems and methods disclosed herein may be applied to such solid state drives to improve rebuilding performance and thereby prevent data loss. The systems and methods may also be applied to memory managers or storage virtualization products that provide RAID-like redundancy/performance on different types of storage media. Furthermore, although the methods according to embodiments of the present invention are described as being implemented in a storage controller 200, the methods are not limited to be implemented in a storage controller 200, but may be implemented all or in part in a host system 106, at the RAID adapter level, within a storage drive 204, or the like.

What is claimed is:

1. A computer-implemented method comprising:
    receiving, by one or more processing units, a rebuilding request of a redundant array of storage drives, the redundant array having a first storage drive to be replaced;
    in response to no spare storage drive being available to logically replace the first storage drive, identifying, by one or more processing units, a second storage drive configured as a source storage drive during implementation of a disk balance process being performed, wherein the disk balance process is copying data from the second storage drive to a third storage drive;
    rebuilding, by one or more processing units, the redundant array of storage drives by reconstructing data of the first storage drive on the second storage drive during the disk balance process;
    dynamically adjusting throughputs for the disk balance process and the rebuilding of the redundant array of storage drive, wherein at a time of the rebuilding request, throughput for the disk balance task ($T_s$) and throughput for rebuilding ($T_r$) are set according to Equation (1):

$$\begin{cases} T_r + T_s = T_b \\ \dfrac{C_d - C_f}{T_s} = C_d / T_r \end{cases} \Rightarrow \begin{cases} T_s = \dfrac{T_b(C_d - C_f)}{2C_d - C_f} \\ T_r = \dfrac{T_b C_d}{2C_d - C_f} \end{cases} \quad \text{Equation (1)}$$

wherein $C_d$ is a total capacity of a source drive, $C_f$ is a free capacity on the source drive at the time of the rebuilding request is raised ($t_0$), $T_b$ is total available throughput for the source drive, $T_s$ is throughput for the disk balance process at $t_0$, $T_r$ is throughput for the rebuilding at $t_0$ and $C_r$ is total capacity of a rebuilding after $t_0$ and before the disk balance completes;

during progress of the disk balance and rebuilding of the redundant array of storage drives, checking after a predefined time whether differences between $T_s$ and $T'_s$ exceed a predefined threshold; and upon exceeding the predefined threshold, updating throughput of disk balance task ($T'_s$) and throughput for rebuilding ($T'_r$) in accordance with Equation (2):

$$\begin{cases} T'_r + T'_s = T_b \\ \dfrac{C_d - C'_f}{T'_s} = \dfrac{C_d - C_r}{T'_r} \end{cases} \Rightarrow \begin{cases} T'_s = \dfrac{T_b(C_d - C'_f)}{2C_d - C'_f - C_r} \\ T'_r = \dfrac{T_b(C_d - C_r)}{2C_d - C'_f - C_r} \end{cases} \quad \text{Equation (2)}$$

2. The method of claim 1, wherein the rebuilding of the redundant array of storage devices includes:
    reconstructing data of the first storage drive on a free area of the second storage drive, wherein original data on the free area has been copied from the second storage drive to the third storage drive during the disk balance process.

3. The method of claim 2, wherein the rebuilding of the redundant array of storage devices further includes:
    dividing, by one or more processing units, available bandwidth for the second storage drive into a first bandwidth for the rebuilding of the redundant array and a second bandwidth for the disk balance process based on total capacity of the second storage drive and capacity of the free area of the second storage drive.

4. The method of claim 3, further comprising:
    adjusting, by one or more processing units, the first bandwidth for the rebuilding of the redundant array and the second bandwidth for the disk balance process based on the total capacity of the second storage drive, current capacity of the free area and current capacity of a rebuilding area on the second storage drive, wherein the rebuilding area on the second storage drive is an area of the second storage drive that includes data reconstructed from the redundant array from the first storage drive.

5. The method of claim 1, further comprising:
    in response to receiving a disk balance related host input and output (I/O) to a rebuilding area of the second storage drive, redirecting, by one or more processing units, the disk balance related host I/O to a corresponding area on the third storage drive, the rebuilding area on the second storage drive being an area including data reconstructed from the redundant array for the first storage drive.

6. The method of claim 1, further comprising:
    in response to receiving a rebuilding related host input and output (I/O) to a balance area of the second storage drive, holding, by one or more processing units, the rebuilding related host I/O until the data in the balance area has been copied to the third storage drive, the balance area on the second storage drive being an area that includes data waiting to be copied to the third storage drive.

7. The method of claim 1, further comprising:
setting, by one or more processing units, the second storage drive to a protected state upon initiating the rebuilding of the redundant array; and
removing, by one or more processing units, the second storage drive from the protected state upon completion of the disk balance process.

8. The method of claim 1, wherein the rebuilding request is a request for a normal array rebuilding or a request for a smart rebuilding.

9. A computer system comprising:
one or more processors;
a memory coupled to at least one of the one or more processors;
a set of computer program instructions stored in the memory and executed by the at least one of the one or more processors to execute the program instructions implementing a method comprising:
receiving a rebuilding request of a redundant array of storage drives, the redundant array having a first storage drive to be replaced;
in response to no spare storage drive being available to logically replace the first storage drive, identifying a second storage drive configured as a source storage drive during implementation of a disk balance process being performed, wherein the disk balance process is copying data from the second storage drive to a third storage drive;
rebuilding of the redundant array of storage devices by reconstructing data of the first storage drive on the second storage drive during the disk balance process;
dynamically adjusting throughputs for the disk balance process and the rebuilding of the redundant array of storage drive, wherein at a time of the rebuilding request, throughput for the disk balance task ($T_s$) and throughput for rebuilding ($T_r$) are set according to Equation (1):

$$\begin{cases} T_r + T_s = T_b \\ \dfrac{C_d - C_f}{T_s} = C_d / T_r \end{cases} \Rightarrow \begin{cases} T_s = \dfrac{T_b(C_d - C_f)}{2C_d - C_f} \\ T_r = \dfrac{T_b C_d}{2C_d - C_f} \end{cases} \quad \text{Equation (1)}$$

wherein $C_d$ is a total capacity of a source drive, $C_f$ is a free capacity on the source drive at the time of the rebuilding request is raised ($t_0$), $T_b$ is total available throughput for the source drive, $T_s$ is throughput for the disk balance process at $t_0$, $T_r$ is throughput for the rebuilding at $t_0$ and $C_r$ is total capacity of a rebuilding after $t_0$ and before the disk balance completes;
during progress of the disk balance and rebuilding of the redundant array of storage drives, checking after a predefined time whether differences between $T_s$ and $T'_s$ exceed a predefined threshold; and
upon exceeding the predefined threshold, updating throughput of disk balance task ($T'_s$) and throughput for rebuilding ($T'_r$) in accordance with Equation (2):

$$\begin{cases} T'_r + T'_s = T_b \\ \dfrac{C_d - C'_f}{T'_s} = \dfrac{C_d - C_r}{T'_r} \end{cases} \Rightarrow \begin{cases} T'_s = \dfrac{T_b(C_d - C'_f)}{2C_d - C'_f - C_r} \\ T'_r = \dfrac{T_b(C_d - C_r)}{2C_d - C'_f - C_r} \end{cases} \quad \text{Equation (2)}$$

10. The computer system of claim 9, wherein the rebuilding of the redundant array of storage devices includes:
reconstructing data of the first storage drive on a free area of the second storage drive, wherein original data of the free area has been copied from the second storage drive to the third storage drive during the disk balance process.

11. The computer system of claim 10, wherein the rebuilding of the redundant array of storage devices further includes:
dividing available bandwidth for the second storage drive into a first bandwidth for the rebuilding of the redundant array and a second bandwidth for the disk balance process based on total capacity of the second storage drive and capacity of the free area of the second storage drive.

12. The computer system of claim 11, further comprising:
adjusting the first bandwidth for the rebuilding of the redundant array and the second bandwidth for the disk balance process based on the total capacity of the second storage drive, current capacity of the free area and current capacity of a rebuilding area on the second storage drive, wherein the rebuilding area on the second storage drive is an area of the second storage device that includes data reconstructed from the redundant array for the first storage drive.

13. The computer system of claim 9, further comprising:
in response to receiving a disk balance related host input and output (I/O) to a rebuilding area of the second storage drive, redirecting the disk balance related host I/O to a corresponding area on the third storage drive, the rebuilding area on the second storage drive being an area including data reconstructed from the redundant array for the first storage drive.

14. The computer system of claim 9, further comprising:
in response to receiving a rebuilding related host input and output (I/O) to a balance area of the second storage drive, holding the rebuilding related host I/O until the data in the balance area has been copied to the third storage drive, the balance area on the second storage drive being an area that includes data still waiting to be copied to the third storage drive.

15. The computer system of claim 9, further comprising:
setting the second storage drive to a protected state upon initiating the rebuilding of the redundant array; and
removing the second storage drive from the protected state upon completion of the disk balance process.

16. A computer program product comprising a computer readable storage medium having program instructions embodied therewith, the program instructions being executable by a device to perform a method comprising:
receiving a rebuilding request of a redundant array of storage drives, the redundant array having a first storage drive to be replaced;
in response to no spare storage drive being available to logically replace the first storage drive, identifying a second storage drive configured as a source storage drive during implementation of a disk balance process being performed, wherein the disk balance process is copying data from the second storage drive to a third storage drive;

rebuilding of the redundant array of storage devices by reconstructing data of the first storage drive on the second storage drive during the disk balance process;

dynamically adjusting throughputs for the disk balance process and the rebuilding of the redundant array of storage drive, wherein at a time of the rebuilding request, throughput for the disk balance task ($T_s$) and throughput for rebuilding ($T_r$) are set according to Equation (1):

$$\begin{cases} T_r + T_s = T_b \\ \dfrac{C_d - C_f}{T_s} = C_d/T_r \end{cases} \Rightarrow \begin{cases} T_s = \dfrac{T_b(C_d - C_f)}{2C_d - C_f} \\ T_r = \dfrac{T_b C_d}{2C_d - C_f} \end{cases} \quad \text{Equation (1)}$$

wherein $C_d$ is a total capacity of a source drive, $C_f$ is a free capacity on the source drive at the time of the rebuilding request is raised ($t_0$), $T_b$ is total available throughput for the source drive, $T_s$ is throughput for the disk balance process at $t_0$, $T_r$ is throughput for the rebuilding at $t_0$ and $C_r$ is total capacity of a rebuilding after $t_0$ and before the disk balance completes;

during progress of the disk balance and rebuilding of the redundant array of storage drives, checking after a predefined time whether differences between $T_s$ and $T'_s$ exceed a predefined threshold; and upon exceeding the predefined threshold, updating throughput of disk balance task ($T'_s$) and throughput for rebuilding ($T'_r$) in accordance with Equation (2):

$$\begin{cases} T'_r + T'_s = T_b \\ \dfrac{C_d - C'_f}{T'_s} = \dfrac{C_d - C_r}{T'_r} \end{cases} \Rightarrow \begin{cases} T'_s = \dfrac{T_b(C_d - C'_f)}{2C_d - C'_f - C_r} \\ T'_r = \dfrac{T_b(C_d - C_r)}{2C_d - C'_f - C_r} \end{cases} \quad \text{Equation (2)}$$

17. The computer program product of claim 16, wherein the rebuilding of the redundant array of storage devices includes:

reconstructing data of the first storage drive on a free area of the second storage drive, wherein original data of the free area has been copied from the second storage drive to the third storage drive during the disk balance process.

18. The computer program product of claim 17, wherein the rebuilding of the redundant array of storage devices further includes:

dividing available bandwidth for the second storage drive into a first bandwidth for the rebuilding of the redundant array and a second bandwidth for the disk balance process based on total capacity of the second storage drive and capacity of the free area of the second storage drive.

19. The computer program product of claim 16, further comprising:

adjusting the first bandwidth for the rebuilding of the redundant array and the second bandwidth for the disk balance process based on the total capacity of the second storage drive, current capacity of the free area and current capacity of a rebuilding area on the second storage drive, wherein the rebuilding area on the second storage drive is an area of the second storage device that includes data reconstructed from the redundant array for the first storage drive.

20. The computer program product of claim 16, further comprising:

in response to receiving a disk balance related host input and output (I/O) to a rebuilding area of the second storage drive, redirecting the disk balance related host I/O to a corresponding area on the third storage drive, the rebuilding area on the second storage drive being an area including data reconstructed from the redundant array for the first storage drive.

* * * * *